US009690937B1

(12) United States Patent
Duchin et al.

(10) Patent No.: US 9,690,937 B1
(45) Date of Patent: Jun. 27, 2017

(54) RECOMMENDING A SET OF MALICIOUS ACTIVITY DETECTION RULES IN AN AUTOMATED, DATA-DRIVEN MANNER

(71) Applicant: EMC Corporation, Hopkinton, MA (US)

(72) Inventors: Zohar Duchin, Hertzliya (IL); Alon Kaufman, Herut (IL); Alex Zaslavsky, Petah Tiqwa (IL); Martin Rosa, Quebec (CA); Luan Nguyen, Falls Church, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 14/672,849

(22) Filed: Mar. 30, 2015

(51) Int. Cl.
H04L 29/00 (2006.01)
G06F 21/56 (2013.01)
H04L 29/06 (2006.01)

(52) U.S. Cl.
CPC ........ *G06F 21/562* (2013.01); *H04L 63/1416* (2013.01); *G06F 2221/034* (2013.01)

(58) Field of Classification Search
CPC ............................ G06F 21/562; H04L 63/1416
See application file for complete search history.

(56) References Cited

U.S. PATENT DOCUMENTS

| 7,530,106 | B1* | 5/2009 | Zaitsev | G06F 21/577 |
| | | | | 713/164 |
| 8,683,563 | B1 | 3/2014 | Van Dijk et al. | |
| 8,683,570 | B1 | 3/2014 | Van Dijk et al. | |
| 8,752,156 | B1 | 6/2014 | Van Dijk et al. | |
| 8,806,627 | B1 | 8/2014 | Aharoni et al. | |
| 8,819,769 | B1 | 8/2014 | van Dijk et al. | |
| 8,825,848 | B1 | 9/2014 | Dotan et al. | |
| 9,015,231 | B1 | 4/2015 | Hodgman et al. | |
| 9,038,178 | B1 | 5/2015 | Lin | |
| 9,064,210 | B1 | 6/2015 | Hart | |
| 9,069,930 | B1 | 6/2015 | Hart | |
| 9,075,991 | B1 | 7/2015 | Leetham | |
| 9,098,699 | B1 | 8/2015 | Zaslavsky et al. | |
| 9,154,516 | B1 | 10/2015 | Vaystikh et al. | |
| 2008/0162452 | A1* | 7/2008 | Cox | H04L 41/0893 |
| 2014/0096184 | A1* | 4/2014 | Zaitsev | G06F 21/56 |
| | | | | 726/1 |
| 2014/0181968 | A1* | 6/2014 | Ge | H04L 63/1425 |
| | | | | 726/23 |
| 2014/0317028 | A1* | 10/2014 | Turgeman | G06N 5/04 |
| | | | | 706/11 |

(Continued)

*Primary Examiner* — Mohammad A Siddiqi
(74) *Attorney, Agent, or Firm* — BainwoodHuang

(57) ABSTRACT

A computer-implemented technique provides rules for use in a malicious activity detection system. The technique involves performing evaluation operations on a plurality of malicious activity detection rules. The technique further involves ranking the plurality of malicious activity detection rules in an order based on results of the evaluation operations (e.g., sorting the rules systematically in an order based on measures such as precision, recall, correlation to other rules already in use, etc.). The technique further involves, based on the order of the plurality of malicious activity detection rules, providing a malicious activity detection rule report which recommends a set of malicious activity detection rules of the plurality of malicious activity detection rules for use in the malicious activity detection system.

20 Claims, 6 Drawing Sheets

(56) References Cited

U.S. PATENT DOCUMENTS

| | | | |
|---|---|---|---|
| 2015/0254555 A1* | 9/2015 | Williams, Jr. | G06N 3/0454 706/14 |
| 2016/0127402 A1* | 5/2016 | Veeramachaneni | H04L 63/1425 726/23 |
| 2016/0180557 A1* | 6/2016 | Yousaf | G06T 11/206 715/762 |

\* cited by examiner

| Malicious Activity Detection Rule | Thresholds and Other Parameters | Strength Sub-Scores | Overall Strength Score |
|---|---|---|---|
| Malicious Activity Detection Rule | Thresholds and Other Parameters | Strength Sub-Scores | Overall Strength Score |
| Malicious Activity Detection Rule | Thresholds and Other Parameters | Strength Sub-Scores | Overall Strength Score |
| ... | ... | ... | ... |

FIG. 5

RECOMMENDING A SET OF MALICIOUS ACTIVITY DETECTION RULES IN AN AUTOMATED, DATA-DRIVEN MANNER

BACKGROUND

An intrusion detection system monitors a computerized environment for policy violations and other indicators of malicious activities. For example, an intrusion detection system for a computer system typically monitors the computer system for the presence of viruses and malware. As another example, an intrusion detection system for a computer network typically monitors network communications for cyberattacks and other malicious transmissions.

During operation of an intrusion detection system, a skilled intrusion detection expert defines what the system scans for (e.g., particular artifact patterns, behaviors, etc.). Typically, such scanning configuration is based on the expert's previous experience (e.g., learning from past incidents) and knowledge (e.g., a manual research for the best intrusion detection policies and thresholds). With such experience and knowledge at hand, the expert may make modifications to policies, thresholds, etc. used by the intrusion detection system in order to keep up with evolving threats.

SUMMARY

Unfortunately, there are deficiencies to the above-described conventional approach in which a skilled intrusion detection expert relies on previous experience and knowledge in determining what an instruction detection system should scan for. For example, this conventional approach is too reliant on the expert's competency thus leading to vulnerabilities and lags in improving security in computerized environments which are managed by less-experienced and less-informed experts.

Additionally, the conventional approach relies on experts to manually research and apply best practices in an ongoing manner. However, it is burdensome for each expert to continuously maintain up-to-date threat awareness and to quickly adapt the instruction detection system in response to evolving threats. Nevertheless, without such vigilant adaptation, the policies and thresholds can quickly become obsolete.

Furthermore, the conventional approach often relies on experts to select the policies and thresholds to apply based on trial and error. That is, in the conventional approach, there is no automation or set process for looking for new policies and thresholds in order to adapt to new and emerging threats. As a result, the instruction detection system frequently suffers from sub-optimal configuration.

In contrast to the above-described conventional approach in which a skilled intrusion detection expert simply relies on experience and knowledge in self-developing policies and thresholds for intrusion detection, improved techniques provide a malicious activity detection rule report which recommends a set of malicious activity detection rules in an automated, data-driven manner. In particular, electronic circuitry creates new malicious activity detection rules, evaluates the new malicious activity detection rules, and recommends particular new malicious activity detection rules based on strength metrics (e.g., based on performance measures such as precision, recall, correlation to other rules already in use, combinations thereof, and so on). Additionally, the electronic circuitry ranks the new rules thus enabling a user to easily determine whether a new rule should be added, whether a new rule should replace an old rule, and so on. Such a systematic process places less burden and reliance on the expert's skill and knowledge and, instead, involves creation, assessment, and recommendation of new malicious activity detection rules in a user-friendly manner based on data.

One embodiment is directed to a computer-implemented method of providing rules for use in a malicious activity detection system. The method includes performing, by processing circuitry, evaluation operations on a plurality of malicious activity detection rules. The method further includes ranking, by the processing circuitry, the plurality of malicious activity detection rules in an order based on results of the evaluation operations. The method further includes, based on the order of the plurality of malicious activity detection rules, providing, by the processing circuitry, a malicious activity detection rule report which recommends a set of malicious activity detection rules of the plurality of malicious activity detection rules for use in the malicious activity detection system.

In some arrangements, the results of the evaluation operations include a plurality of numerical scores for the plurality of malicious activity detection rules. In these arrangements, ranking the plurality of malicious activity detection rules in the order includes sorting the plurality of malicious activity detection rules based on the numerical scores for the plurality of malicious activity detection rules.

In some arrangements, performing the evaluation operations on the plurality of malicious activity detection rules includes deriving, for each rule of the plurality of malicious activity detection rules, a strength value indicating an amount of strength for that rule in detecting malicious activity relative to the other rules of the plurality of malicious activity detection rules.

In some arrangements, deriving the overall strength value for each rule includes generating, for each rule, a precision score which indicates an effectiveness of that rule in correctly identifying malicious activity from activity which is labeled as malicious by the malicious activity detection system.

In some arrangements, deriving the overall strength value for each rule includes generating, for each rule, a recall score which indicates an effectiveness of that rule in correctly identifying malicious activity from actual malicious activity which is handled by the malicious activity detection system.

In some arrangements, deriving the overall strength value for each rule includes generating, for each rule, a correlation score which indicates a strength of correlation between that rule and malicious activity detection rules which are currently in use by the malicious activity detection system.

In some arrangements, deriving the overall strength value for each rule includes generating, for each rule:
  (i) a precision score which indicates an effectiveness of that rule in correctly identifying malicious activity from activity which is labeled as malicious by the malicious activity detection system,
  (ii) a recall score which indicates an effectiveness of that rule in correctly identifying malicious activity from actual malicious activity which is handled by the malicious activity detection system, and
  (iii) a correlation score which indicates a strength of correlation between that rule and malicious activity detection rules which are currently in use by the malicious activity detection system.

In these arrangements, deriving the overall strength value for each rule further includes providing, as the strength value for each rule, an overall score based on the precision score, the recall score, and the correlation score for that rule.

In some arrangements, the method further includes, prior to performing the evaluation operations, creating a set of new malicious activity detection rules and including the set of new malicious activity detection rules in the plurality of malicious activity detection rules. In some arrangements, creating the set of new malicious activity detection rules includes performing random forest operations to generate the set of new malicious activity detection rules. In other arrangements, creating the set of new malicious activity detection rules includes using association rules to generate the set of new malicious activity detection rules. In yet other arrangements, creating the set of new malicious activity detection rules includes combining and/or adjusting existing malicious activity detection rules (e.g., changing attributes, thresholds, etc.) to generate the set of new malicious activity detection rules.

In some arrangements, creating the set of new malicious activity detection rules includes providing, for a particular new malicious activity detection rule, a set of thresholds to define an aspect of that rule.

In some arrangements, the method further includes, based on the malicious activity detection rule report which recommends the set of malicious activity detection rules, introducing a new malicious activity detection rule into the malicious activity detection system to detect malicious activity. In these arrangements, the new malicious activity detection rule is selected from the set of malicious activity detection rules.

In some arrangements, the malicious activity detection system is constructed and arranged to detect malware at rest within a computerized device. In these arrangements, introducing the new malicious activity detection rule includes configuring malware detection circuitry to detect malware at rest within the computerized device using the new malicious activity detection rule.

In some arrangements, the malicious activity detection system is constructed and arranged to detect malware inflight within a computerized network. In these arrangements, introducing the new malicious activity detection rule includes configuring malware detection circuitry to detect malware inflight within the computerized network using the new malicious activity detection rule.

In some arrangements, the malicious activity detection system is constructed and arranged to detect fraudulent activity during authentication. In these arrangements, introducing the new malicious activity detection rule includes configuring malware detection circuitry to detect fraudulent activity during authentication using the new malicious activity detection rule.

Another embodiment is directed to a computer program product having a non-transitory computer readable medium which stores a set of instructions to provide rules for use in a malicious activity detection system. In these arrangements, the set of instructions, when carried out by computerized circuitry, causes the computerized circuitry to perform a method of:

(A) performing evaluation operations on a plurality of malicious activity detection rules;
(B) ranking the plurality of malicious activity detection rules in an order based on results of the evaluation operations; and
(C) based on the order of the plurality of malicious activity detection rules, providing a malicious activity detection rule report which recommends a set of malicious activity detection rules of the plurality of malicious activity detection rules for use in the malicious activity detection system.

Yet another embodiment is directed to an electronic apparatus which includes a user interface, memory, and control circuitry coupled to the user interface and the memory. The memory stores instructions which, when carried out by the control circuitry, cause the control circuitry to:

(A) perform evaluation operations on a plurality of malicious activity detection rules,
(B) rank the plurality of malicious activity detection rules in an order based on results of the evaluation operations, and
(C) based on the order of the plurality of malicious activity detection rules, provide a malicious activity detection rule report which recommends a set of malicious activity detection rules of the plurality of malicious activity detection rules for use in the malicious activity detection system.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved recommending a set of malicious activity detection rules in an automated, data-driven manner.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is a block diagram of an example malicious activity detection rule report provided by the electronic apparatus of FIG. 2.

DETAILED DESCRIPTION

An improved technique provides a malicious activity detection rule report which recommends a set of malicious activity detection rules in an automated, data-driven manner. In particular, an electronic apparatus collects data from an electronic environment, creates new malicious activity detection rules, evaluates the new malicious activity detection rules using the collected data, and recommends particular new malicious activity detection rules based on strength metrics (e.g., based on performance measures such as precision, recall, correlation to other rules already in use, combinations thereof, and so on). Furthermore, the electronic apparatus ranks the new rules thus enabling a user (e.g., an intrusion detection administrator) to easily determine whether a new rule should be used for malicious activity detection, whether a new rule should replace an old rule, and so on. Such a systematic process places less burden and reliance on the user's skill and knowledge and, instead, enables creation, assessment, and recommendation of new malicious activity detection rules in a user-friendly manner based on data.

Figure 1:
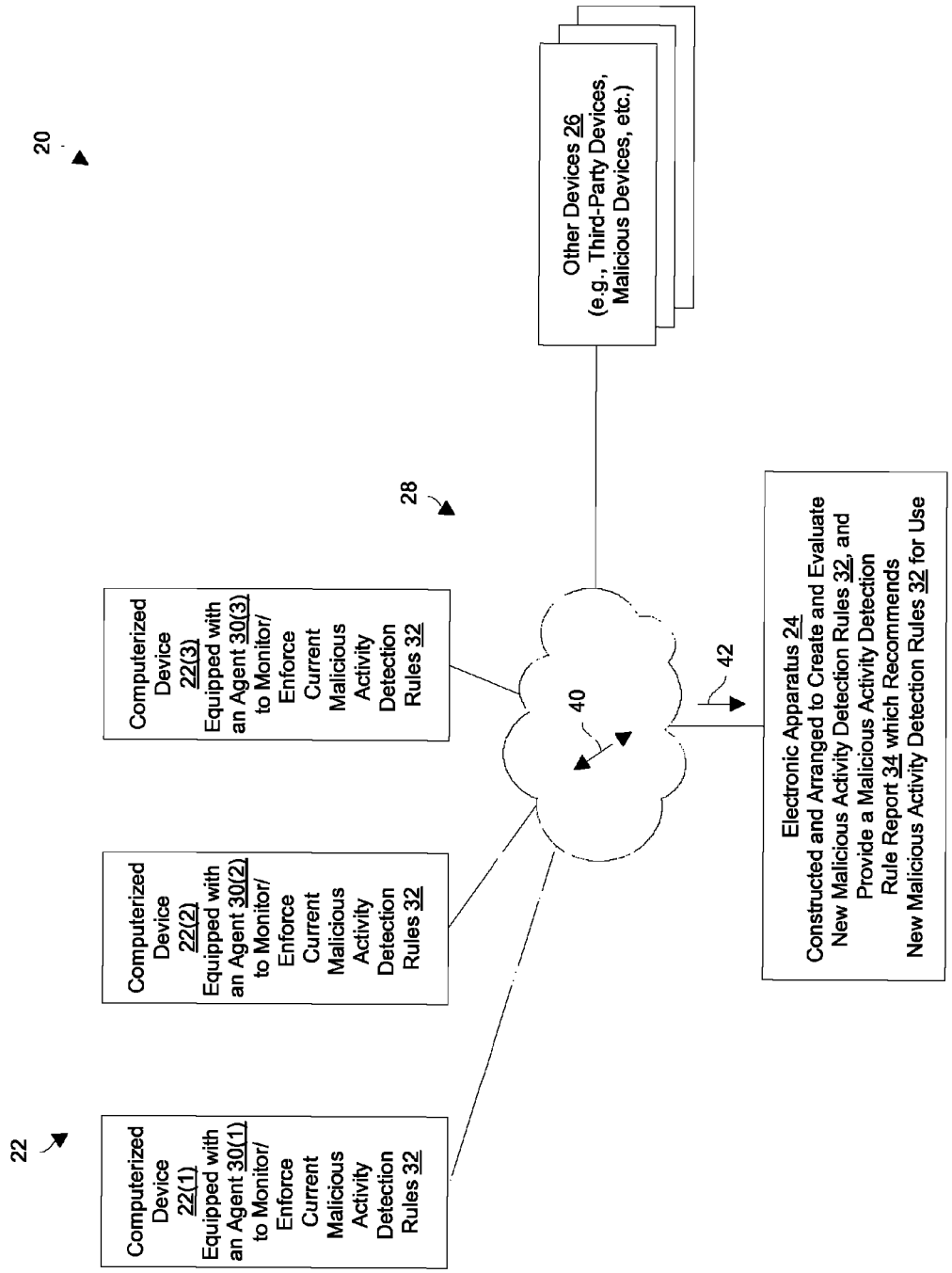
FIG. 1 is a block diagram of an electronic environment which implements malicious activity detection.

FIG. 1 shows an electronic environment 20 which implements malicious activity detection. The electronic environment 20 includes computerized devices 22(1), 22(2), 22(3), . . . (collectively, computerized devices 22), an electronic apparatus 24, other devices 26, and a communications medium 28. In some arrangements, the electronic environment 20 represents a portion of an enterprises computerized environment (e.g., a local area network, wide area network, a virtual private network, etc.).

Each computerized device 22 is constructed and arranged to perform useful work. Examples of suitable computerized devices 22 include client devices (e.g., user desktop computers, tablets, smart phones, etc.), server devices (e.g., transaction servers, file servers, content servers, authentication servers, etc.), specialized devices (e.g., network devices, appliances, etc.), and so on. Such devices 22 are equipped with respective agents 30(1), 30(2), 30(3), . . . (collectively, agents 30) to monitor and/or enforce security (i.e., malicious activity detection) using a current set of malicious activity detection rules 32 for malicious activity detection.

The electronic apparatus 24 is constructed and arranged to provide a malicious activity detection rule report 34 which recommends new malicious activity detection rules 32 for possible use in malicious activity detection. As will be explained in further detail shortly, the electronic apparatus 24 routinely communicates with the agent 30 on each computerized device 22 to form a malicious activity detection system. To this end the electronic apparatus 24 is constructed and arranged to collect data, as well as to create new malicious activity detection rules 32, evaluate the new malicious activity detection rules 32, and recommend certain new malicious activity detection rules 32 for use. With such new malicious activity detection rules 32 being recommended to a user (e.g., a system administrator or malicious activity detection expert), the user does not need to rely heavily on past experience and knowledge. Rather, in a user-friendly manner, the user is able to review new malicious activity detection rule recommendations from the electronic apparatus 24 and select which rules 32 to use going forward. Due to the automated, data-driven manner in which the new rules 32 are evaluated and provided, the user has confidence that the use of the new rules 32 will be effective in detecting malicious activity as threats continue to evolve and emerge.

The other devices 26 represent equipment which may be able to access the computerized devices 22. Such equipment may include other third-party devices, malicious devices operated by attackers/fraudsters/etc., and so on.

The communications medium 28 is constructed and arranged to connect the various components of the electronic environment 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the computerized devices 22 perform useful work (e.g., operate as clients, provide services, support an enterprise's infrastructure, etc.). During such operation, the agents 30 on the computerized devices 22 apply a current set of malicious activity detection rules 32 to scan for possible security threats, i.e., malicious activity detection. In particular, each agent 30 collects data 42 about benign and malicious objects and activities, and reports that data 42 back to the electronic apparatus 24.

The electronic apparatus 24 gathers the data 42 from the agents 30, and constructs new malicious activity detection rules 32 for possible use in malicious activity detection. In particular, the electronic apparatus 24 creates new malicious activity detection rules 32 based on the collected data 42, and evaluates the new malicious activity detection rules 32 against the data 42 (e.g., using strength assessment measures such as average precision, information gain, likelihood of sufficiency, average recall, area under the radius of curvature, and so on). Additionally, the electronic apparatus 24 calculates how well correlated the newly created malicious activity detection rules 32 are to the set of malicious activity detection rules 32 currently used by the agents 30. Based on these results, the electronic apparatus 24 provides a malicious activity detection rule report 34 which recommends new malicious activity detection rules 32 for possible use by the agents 30.

Due to the ability of the electronic apparatus 24 to recommend new malicious activity detection rules 32 in an automated and data-driven manner, the security detection abilities of the computerized devices 22 are less dependent on the competency of a skilled expert. That is, the user does not need to maintain intense vigilance by constantly performing manual research to identify and apply the best intrusion detection practices. Rather, with the improved techniques disclosed herein, the user directs the electronic apparatus 24 to create and evaluate new malicious activity detection rules 32, and then recommend rules 32 (e.g., individual rules 32, combinations of rules 32, etc.) that provide the best performance as determined systematically by the data 42. Accordingly, such techniques are less burdensome and more user-friendly.

At this point, it should be understood that there may be a variety of different use cases for the improved techniques disclosed herein. Along these lines, the format or syntax for each malicious activity detection rule 32 or indicator of compromise (IOC), may vary depending on the context. However, a typical rule 32 may include a particular attribute (e.g., a file location, file visibility, etc.), an operation (e.g., equal, greater than, within, etc.) and a value (e.g., a specific path, a number, a list of strings, etc.). These aspects of the rules 32 may be better understood after a discussion of particular use cases.

In one use case, the agents 30 of the computerized devices 22 apply the malicious activity detection rules 32 to detect the presence of malicious objects such as viruses and malware at rest within a computer system. Such malicious objects may be identified by certain attributes such as file size, file type or extension, file name, file location, whether the file is hidden, whether the file contains certain code, and so on. Upon detection of such an object, the agents 30 may be configured to quarantine the object, block the object from executing, etc. to render the object harmless.

In another use case, the agents 30 of the computerized devices 22 apply the malicious activity detection rules 32 to scan data inflight (e.g., within a network device such as a gateway or a router) to discover a cyberattack, transmissions with malicious payloads, malicious probing, and so on. Such malicious activities may be identified by a variety of factors including source IP address, destination IP address, certain header information, packet size, time of day, transmission frequency, whether the transmission includes certain text/code/attachments/link/etc., whether an attachment is hidden, and so on. Upon detection of such malicious activity, the agents 30 may be configured to block the transmission, filter out a malicious portion of the transmission, allow the transmission to proceed in a deactivated way, etc. to render the malicious activity harmless.

In yet another use case, the computerized devices 22 are authentication servers constructed and arranged to authenticate human users in response to received authentication requests (i.e., to determine whether the users are legitimate or imposters). Here, the agents 30 may be risk engines that are involved in applying the malicious activity detection rules 32 to the data contained in the authentication requests to generate weights, overall risk scores, sub-scores, etc. which serve as numerical measures of risk (i.e., the likelihood that the user is an imposter). Here, the risk engines evaluate a multitude of authentication factors such as passcodes, biometrics, and extraneous factors (e.g., geolocation, user device capabilities, typing speed, motion, time of day, etc.). Upon detection of malicious activity using the rules 32 (e.g., failed authentication), the agents 30 may be configured to block user access to a protected resource, lockout the user, perform step-up authentication, take a remedial action (e.g., send a warning, sound an alert, add the source of the authentication request to a blacklist, etc.), combinations thereof, and so on.

Other applications of the improved techniques, use cases, and situations are suitable for use as well. Further details will now be provided with reference to FIG. 2.

Figure 2:
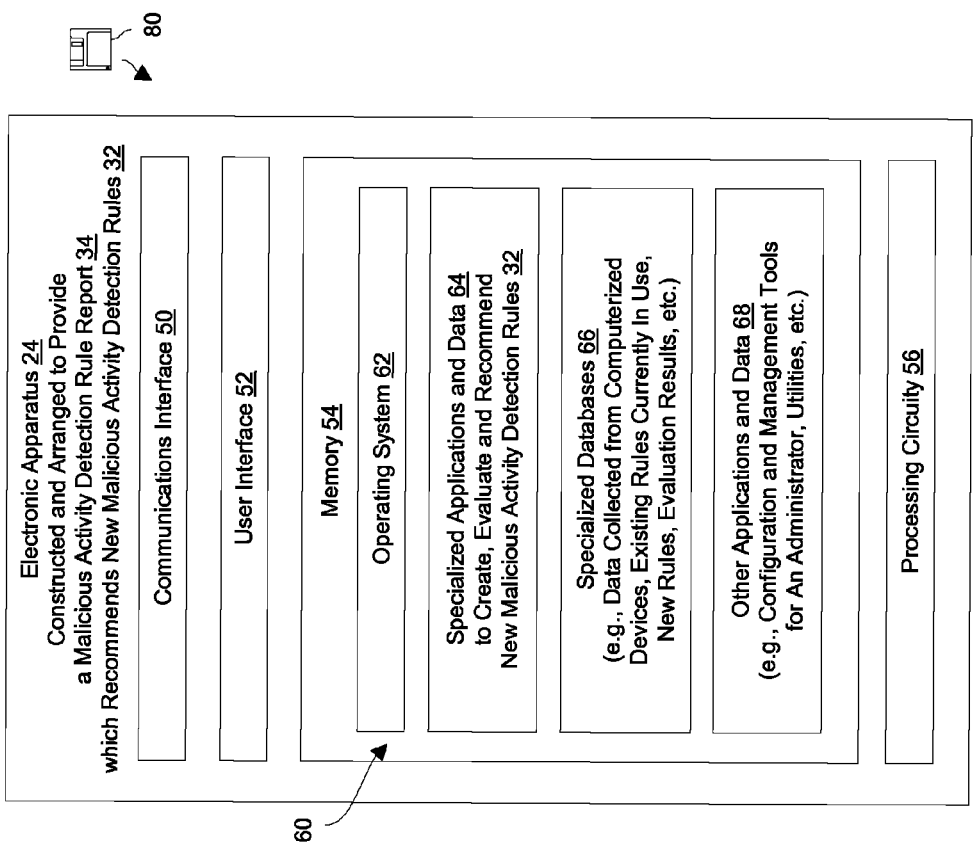
FIG. 2 is a block diagram of an electronic apparatus of the electronic environment of FIG. 1 which recommends a set of malicious activity detection rules in an automated, data-driven manner.

FIG. 2 shows particular details of the electronic apparatus 24 which is constructed and arranged to provide a malicious activity detection rule report 34 that recommends new malicious activity detection rules 32. The electronic apparatus 24 includes a communications interface 50, a user interface 52, memory 54, and processing circuitry 56.

The communications interface 50 is constructed and arranged to connect the electronic apparatus 24 to the communications medium 28 (FIG. 1) to enable communications with other devices of the electronic environment 20 (e.g., the computerized devices 22). Such communications may be IP-based, SAN-based, cellular-based, cable-based, fiber-optic based, wireless, combinations thereof, and so on. Accordingly, the communications interface 50 enables the electronic apparatus 24 to robustly and reliably communicate with other apparatus.

The user interface 52 is constructed and arranged to receive user input from, and to provide user output to one or more users of the electronic apparatus 24 (e.g., intrusion detection system administrators). Along these lines, the user interface 52 may include a keyboard, a pointing device (e.g., a mouse, a touch pad, a trackball, etc.), and an electronic display.

The memory 54 is intended to represent both volatile storage (e.g., DRAM, SRAM, etc.) and non-volatile storage (e.g., flash memory, magnetic memory, etc.). The memory 54 stores a variety of software constructs 60 including an operating system 62 to manage resources of the electronic apparatus 24 (e.g., processor cycles, memory space, etc.), specialized applications and data 64 to create, evaluate and recommend new malicious activity detection rules 32, specialized databases 66 (e.g., data collected from the computerized devices 22, existing rules currently in use, new rules, evaluation results, and so on), and other applications and data 68 (e.g., configuration and management tools, utilities, other user level applications, etc.).

The processing circuitry 56 is constructed and arranged to operate in accordance with the various software constructs 60 stored in the memory 54. As will be explained in further detail shortly, the processing circuitry 56 executes in accordance with the set of specialized applications and data 64 to create, evaluate and recommend new malicious activity detection rules 32. Such processing circuitry 56 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 60 to the electronic apparatus 24. In particular, the computer program product 80 has a non-transitory (or non-volatile) computer readable medium which stores a set of instructions which controls one or more operations of the electronic apparatus 24. Examples of suitable computer readable storage media include tangible articles of manufacture and apparatus which store instructions in a non-volatile manner such as CD-ROM, flash memory, disk memory, tape memory, and the like.

During operation, the electronic apparatus 24 performs useful work. In particular, the electronic apparatus 24 collects data 42 regarding benign and malicious objects and activities from the agents 30 of the computerized devices 22, and automatically constructs new malicious activity detection rules 32 based on the data 42. In particular, specialized circuitry which is formed by the processing circuitry 56 executing in accordance with the specialized applications and data 64 routinely processes the collected data 42 and derives new activity detection rules 32 that satisfy predefined criteria and positively contribute to malicious activity detection. Such process for deriving the new rules 32 may involve algorithms, statistics, and learning techniques such as random forest algorithms, association rules, regression analysis, combinations thereof, and so on. Additionally, because some security threat may evolve or change appearance, the specialized circuitry may take existing rules 32 and modify one or more threshold parameters (e.g., size, recurrence, time, etc.). Accordingly, the electronic apparatus 24 now has new rules 32 or modified existing rules 32 (hereinafter simply referred to as the new rules 32) which may provide improved malicious activity detection results.

The electronic apparatus 24 then evaluates the new rules 32 to determine whether one or more of the new rules 32 should be used for future malicious activity detection. Such evaluation may include a "strength" assessment, e.g., a determination of overall performance based on metrics such as average precision, information gain, likelihood of sufficiency, average recall, area under the radius of curvature curve, etc. Additionally, the electronic apparatus 24 may calculate correlation between the new rules 32 and the existing rules 32 currently employed by the agents 30 of the computerized devices 22. Furthermore, the electronic apparatus 24 can look for combinations of new rules 32 with existing rules 32, and recommend rule combinations that deliver higher performance. Further details of this process will now be provided with reference to FIG. 3.

Figure 3:
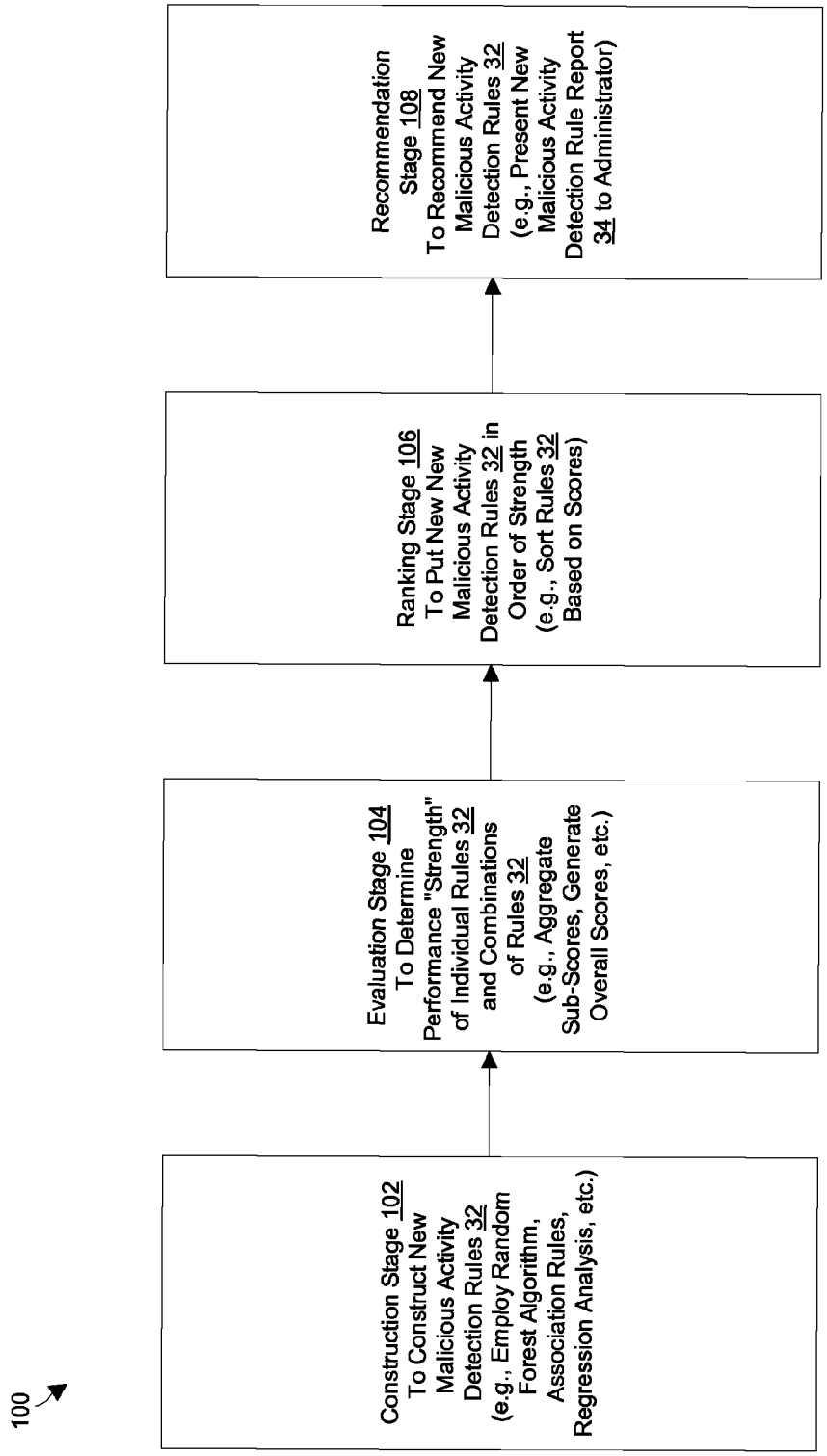
FIG. 3 shows a new rule recommendation process which is carried out by the electronic apparatus of FIG. 2.

FIG. 3 illustrates the process 100 performed by the specialized circuitry of the electronic apparatus 24 when recommending new malicious activity detection rules 32 to a user. Recall that the specialized circuitry is formed by the processing circuitry 56 executing in accordance with the specialized applications and data 64 (also see FIG. 2). As shown, the process 100 is arranged as a pipelined series of stages including a construction stage 102, an evaluation stage 104, a ranking stage 106, and a recommendation stage 108.

In the construction stage 102, the specialized circuitry constructs new malicious activity detection rules 32. In particular, the specialized circuitry derives the new rules 32 (e.g., newly created rules 32, existing rules 32 with new thresholds/parameters, etc.) using analytics such as algorithms, statistics, and learning techniques. Examples of suitable analytics include random forest techniques, associate rules, regression analysis, and so on.

In the evaluation stage 104, the specialized circuitry determines a performance strength for each new malicious activity detection rule 32. Recall that an existing rule 32 with new thresholds/parameters is referred to as a new rule 32. Here, the specialized circuitry generates a measure of performance for each new rule 32 (e.g., using strength assessment measures such as average precision, information gain, likelihood of sufficiency, average recall, area under the radius of curvature, combinations thereof, and so on). In some arrangements, the specialized circuitry generates sub-scores from particular perspectives (e.g., a precision sub-score, a recall sub-score, a correlation to existing rules sub-score, etc.), and then computes an overall score based on the sub-scores.

In the ranking stage 106, the specialized circuitry ranks the new malicious activity detection rules 32 in view of performance. In particular, the specialized circuitry sorts the new malicious activity detection rules 32 based on score.

In the recommendation stage 108, the specialized circuitry recommends new malicious activity detection rules 32 for use going forward. Here, the specialized circuitry provides a malicious activity detection rule report 34 which recommends new malicious activity detection rules 32 for possible use in malicious activity detection.

It should be understood that, in some arrangements, the procedure 100 is ongoing. Moreover, the user may step in at any stage and operate the specialized circuitry manually as a tool to hone, tweak, modify, adjust the rules 32 (e.g., to change thresholds and/or parameters) and reporting features to identify an optimum set of rules 32 for deployment and use by the computerized devices 22. For example, the user can create a new detection rule 32, and direct the system to immediately provide feedback on that rule 32. Such processing may save the user further time of trial and error for adjustment and evaluation of the new rule 32. Further details will now be provided with reference to FIG. 4.

Figure 4:
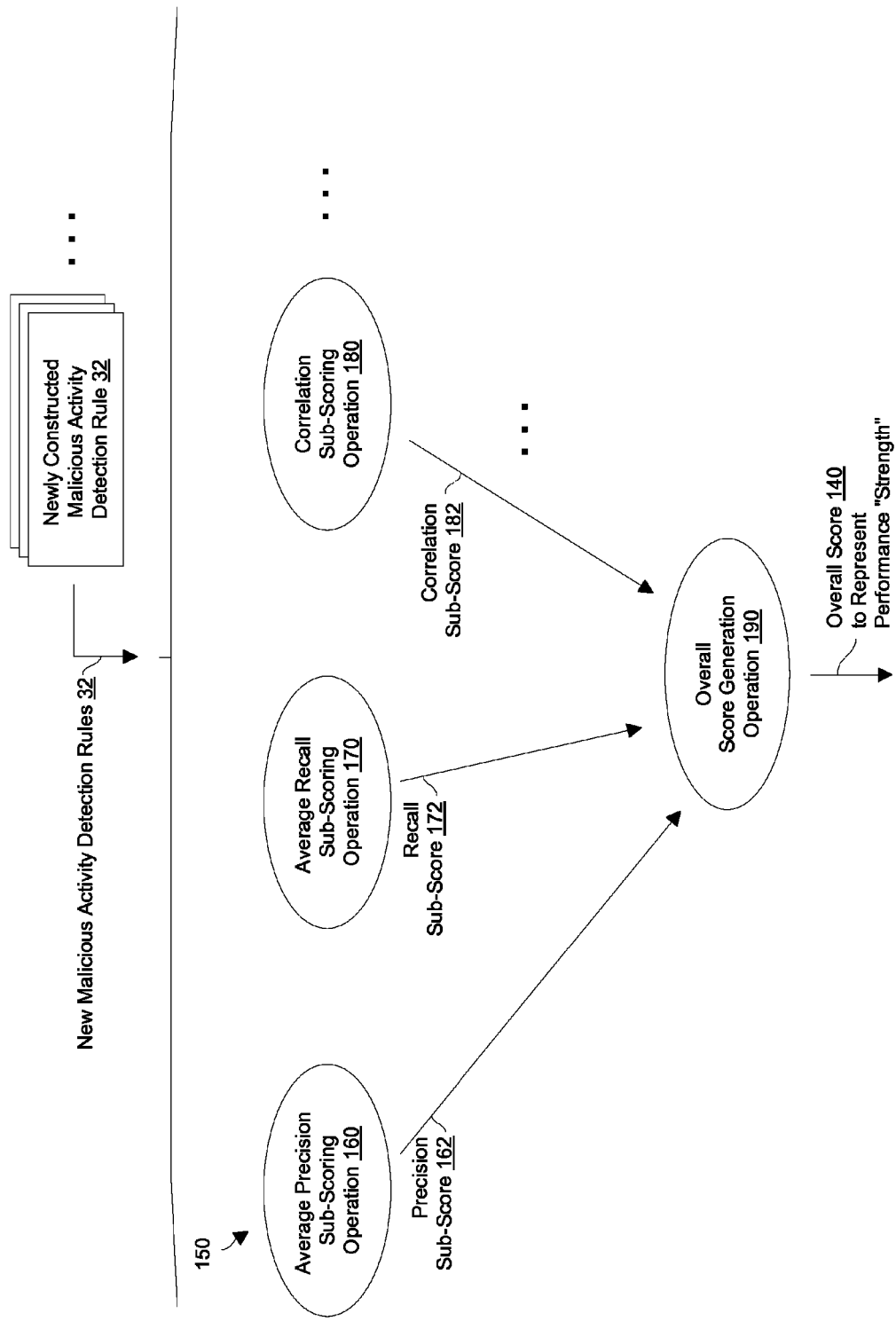
FIG. 4 shows how the electronic apparatus of FIG. 2 generates a measure of performance strength for each malicious activity detection rule or combination of rules.

FIG. 4 shows how the electronic apparatus 24 generates a measure of performance strength for each malicious activity detection rule 32 or combination of rules 32. In particular, as represented by the above-mentioned evaluation stage 104 (also see FIG. 3), the electronic apparatus 24 generates an overall numerical score 140 for each new malicious activity detection rule 32. The value of this score 140 indicates an amount of strength for that rule 32 in detecting malicious activity relative to the other rules 32.

As shown in FIG. 4, the electronic apparatus 24 performs individual scoring operations 150 to generate sub-scores. By way of example, the electronic apparatus 24 performs an average precision sub-scoring operation 160 to generate a precision sub-score 162 (e.g., how well a rule 32 correctly detects a malicious activity from known malicious activities). Additionally, the electronic apparatus 24 performs an average recall sub-scoring operation 170 to generate a recall sub-score 172 (e.g., how well a rule 32 correctly detects a malicious activity from all monitored activities). Furthermore, the electronic apparatus 24 performs a correlation sub-scoring operation 180 to generate a precision sub-score 182 (e.g., where less correlation with currently used rules 32 can be considered better), and so on. Other sub-scoring operations are suitable for use as well (e.g., information gain, likelihood of sufficiency, area under the radius of curvature, combinations thereof, and so on).

Next, the electronic apparatus 24 performs an overall score generation operation 190 to generate the overall score 140. In some arrangements, the electronic apparatus 24 simply tallies the sub-scores together. In other arrangements, the electronic apparatus 24 performs other operations such as normalization, weighting, etc. The generated overall score 140 represents relative performance strength and enables the various new rules 32 to be compared to each other. Further details will be provided with reference to FIG. 5.

FIG. 5 shows an example malicious activity detection rule report 34 which is provided by the electronic apparatus 24. As shown, the example malicious activity detection rule report 34 is a list of sorted entries 202(1), 202(2), 202(3), . . . (collectively, entries 202). Each entry identifies a particular malicious activity detection rule 32, thresholds and/or parameters, strength sub-scores, and an overall strength score (also see FIG. 4). In some arrangements, the rules 32 are ranked from the best performers to the worst performers (i.e., the rules 32 that delivered the strongest performance are listed first or at the top of the report 34).

Other fields are suitable for use as well (e.g., a rule identifier to uniquely identify each rule, a date of creation for that rule, a list of other rules that are closely correlated to the current rule, a list of other rules that complement the current rule, etc.). In some arrangements, particular malicious activity detection rules 32 that exceed a certain predefined strength threshold are highlighted to bring such rules 32 quickly to the attention of the viewing user. Accordingly, the user is able to quickly focus on possible new candidate rules 32 for use in malicious activity detection.

In some arrangements, the rules 32 are delivered in the form of a spreadsheet to enable the user to sort the rules 32 via other aspects such as by individual sub-scores. This feature is useful if the user is looking for a rule 32 to cover a particular situation due to a newly discovered threat. Other sorting and filtering techniques are suitable for use as well (e.g., based on keyword, based on IOC term, based on threshold or category, and so on).

Figure 6:
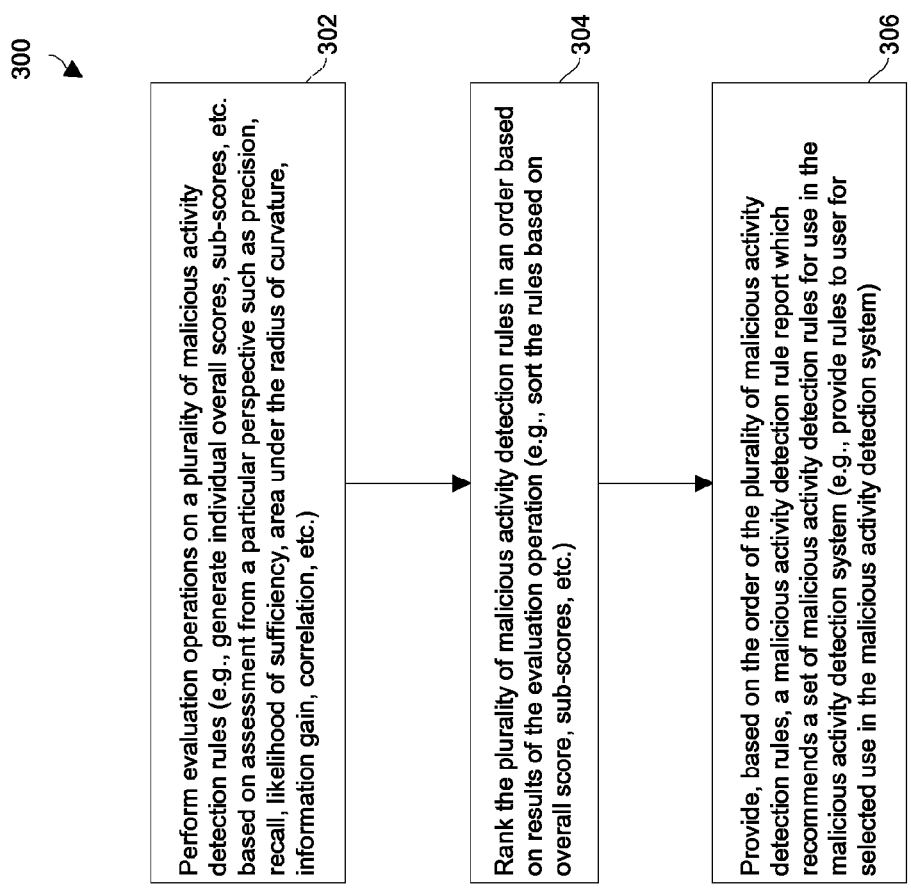
FIG. 6 is a flowchart of a procedure which is performed by the electronic apparatus of FIG. 2.

FIG. 6 is a flowchart of a procedure 300 which is performed by the electronic apparatus 24 to providing rules for use in a malicious activity detection system (also see FIG. 1). At 302, the electronic apparatus 24 performs evaluation operations on a plurality of malicious activity detection rules 32. In particular, the electronic apparatus 24 generates individual sub-scores for each rule 32 based on an assessment from a particular perspective, e.g., precision, recall, correlation, etc. (also see FIG. 4). In some arrangements, the plurality of malicious activity detection rules 32 includes newly created rules 32 as well as existing rules 32 with new thresholds/parameters/etc.

At 304, the electronic apparatus 24 ranks the plurality of malicious activity detection rules 32 in an order based on results of the evaluation operations. Here, the electronic apparatus 24 sorts the rules 32 based on overall score and thus lists the rules 32 in order of overall strength in detecting malicious activity.

At 306, the electronic apparatus 24 provides, based on the order of the plurality of malicious activity detection rules, a malicious activity detection rule report which recommends a set of malicious activity detection rules of the plurality of malicious activity detection rules for use in the malicious activity detection system.

As described above, improved techniques provide a malicious activity detection rule report 34 which recommends a set of malicious activity detection rules 32 in an automated, data-driven manner. In particular, electronic circuitry creates new malicious activity detection rules 32, evaluates the new malicious activity detection rules 32, and recommends particular new malicious activity detection rules 32 based on strength metrics (e.g., based on performance measures such as precision, recall, correlation to other rules already in use, combinations thereof, and so on). Additionally, the electronic circuitry ranks the new rules 32 thus enabling a user to easily determine whether a new rule 32 should be added, whether a new rule 32 should replace an old rule 32, and so on. Such a systematic process places less burden and reliance on the expert's skill and knowledge and, instead, involves creation, assessment, and recommendation of new malicious activity detection rules in a user-friendly manner based on data.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that indicator of compromise (IOC) may be a common synonym to a rule written by a domain expert that intends to detect malicious activity characteristics. For example, one can define that a file that is hidden and arrives from an unknown source should be flagged. Most conventional systems that are designed to detect malware consist of dozens of such rules which serve as inputs to a classification engine that either classifies an object as malicious or provides an analyst with a total score that resembles the probability of the object to be malicious.

Furthermore, it appears that good performance by such systems can depend on designing and creating good IOCs that will detect together most of the cases of suspicious modules and activities. However, in the presence of dozens of different IOCs this task becomes more and more difficult. For instance, when creating a new IOC, how should the domain expert know whether the new IOC contributes to the detection of malware or just add false detection to the system? How can the expert know whether there is already an IOC that provides a totally correlated detection to the new IOC turning it to be completely redundant? Moreover, in a world of ever changing security threats, how can a domain expert know in advance which IOC to design in order to detect an emerging security threat? Advantageously, certain techniques disclosed herein support the design of new IOCs by providing data-driven information and recommendations to the domain expert all along the process of creation. This support and recommendation can be derived from in-house enterprise information security data and potentially from outside information that can be shared between enterprises without intellectual property concerns.

To support the design of new IOC, valuable information and recommendations all along the process of creating a new IOC is provided. In particular, creation of a new IOC may involve the following:

1. Define which attribute or set of attributes to look at.
2. Set thresholds and define categories (in cases where the attributes are not binary).
3. Review the overall performance.

It should be understood that term attributes can refer to the different characteristics of a file and its behavior. These attributes may have many discrete values or continuous values that can then be categorized into categories. For example, an attribute might be the file size that can be categorized into small, medium and large categories.

The techniques disclosed herein support all of the above steps and makes them easy and straight-forward to do. There are multiple points to the techniques: performance review, thresholds settings, and attributes selection.

It should be understood that a malware detection system contains a database (or databases) with a high number of historical records that contain various attributes each. In addition, at least some of these records are classified as benign or malicious by a security analyst. It should be noted that the database may contain data from the enterprise itself and/or other enterprises that shares their records.

When a new IOC is defined, the system suggests that the performance of the new IOC will be instantly and automatically analyzed using the available database. With this data, the analyst can instantly see how "strong" the new IOC is. For example, the system may provide the average precision for the IOC as a stand-alone classifier. It may also provide the information gain that this IOC delivers. Additional measures may be used such as likelihood of sufficiency, average recall, area under ROC curve (AUC), and so on. Furthermore, by calculating the correlation between to the existing IOCs (to what extent the two IOCs goes together), the system can alert if there is an IOC that already detects the same malware or malicious activities as the new IOC, making it redundant. Moreover, the system can go through combinations of the new IOC with existing IOCs and recommend possible combinations of IOCs that presents high performance according to defined criteria. For example, let's say that a new IOC was created to detect whether a file is hidden. The system can scan the existing IOC repository and suggests combining the newly created IOC with an IOC that is triggered when the file is located in AppData folder of the Windows® operating system.

It should be further understood that the values of the new IOC are extracted from the database for each record together with the classification. Performance parameters are calculated for the newly defined IOC letting the user to know in advance the quality of the IOC. The values of the new IOC are correlated to the values of all other IOCs. Providing the user with information about potential correlation with existing IOC or suggesting to combine the new IOC with an existing one.

Additionally, some IOCs contains thresholds that aim to define when a phenomenon is suspicious. For example, let's take the frequency that a process accesses the network. This frequency is continuous and the domain expert may define that if this frequency is above a certain threshold then an IOC is triggered. For a newly selected attribute, the system automatically and instantly provides the expert with support that assists with selecting the right threshold.

For example, a graph may be used to provide information about the precision and recall for a range of threshold values. Using such information, it should be very valuable for an expert to define the threshold values that best serves him. Moreover, the system can automatically calculate the performance of the whole malware detection model using various thresholds and recommend the expert with the threshold value that provides the best overall performance.

In a different flavor, the same thing can be used to provide the user with similar information once the expert has set a threshold, preventing him from selecting thresholds values that are useless or far from being optimal.

Also, it should be understood that the attribute values for the records that exist in the database are calculated.

The techniques are further able to recommend particular thresholds for effective detection from particular perspectives such as information gain, or any other performance parameters. Moreover, information about various threshold settings can be provided on a precision-recall graph, for example, or any other performance descriptive parameters.

One should note that generally, it is quite difficult to decide which IOC has a potential to enhance the detection of new malware. However, with the disclosed techniques, circuitry can periodically perform an automated search over the existing data for new rules that are most promising to serve as good IOCs. Every now and then, when additional records are being added to the database, an algorithm such as random forest or association rules runs over the existing data to try and extract new rules that meet predefined criteria and may contribute to malware detection. Because threats always change and appear, it is expected that such a process will suggest new thresholds for existing IOCs that adapt to the changing environment, as well as suggest new IOCs (in the form of a decision tree or rule) that detect emerging threats.

The classified records in the database are inserted to classification algorithm such as Random Forest. New threshold are being suggested to enhance the performance of the IOC and the overall detection model. New IOCs are being suggested based on best decision trees/rules that were created by the algorithm. Using this method based either internally on an enterprise's records database or externally on other enterprises shared datasets, the creation of new IOCs is enhanced making this process much more data-driven, informative and user friendly.

Former conventional approaches that are used until now to create IOCs are typically based on domain experts' knowledge. This conventional approach suffers from its total reliance on the experts' competency and the fact that the full impact of a newly created IOC or a newly defined threshold can be noticed only after a while. In particular, former conventional approaches consist of a manual search for the best threshold or rules. Because of the vast options, doing such a task manually often ends up with a sub-optimal configuration. Additionally, former conventional approaches have no automation in the task of looking for new IOCs and thresholds that may adapt to emerging threats. Furthermore, like all policies, IOCs are subject to a life cycle, meaning that they should be adjusted over time or become obsolete. Former conventional approaches have no organized way to follow existing IOCs and update them. Moreover, there is no recommendation system for IOCs or supportive mechanism for IOC setup.

However, with the improved techniques disclosed herein, collected enterprise data about benign and malicious objects is used in order to automatically provide the user with supportive information in the process of creating a new IOC or adjusting an existing one. These techniques can significantly shorten the time it takes for a domain expert to create a new IOC. Moreover, using these techniques enables a user with moderate skills to create, adjust and monitor IOC performance with data-proven optimal results.

Unlike former data-conventional approaches, the improved techniques provide a way to monitor a set of existing IOCs and update them according to the changes as they are reflected in the data. Also, the improved techniques provide a way to automatically derive new IOCs from the data. This may significantly shorten the time from a new threat that is introduce to the enterprise network, until an appropriate IOC is defined to detect such a threat and protect the enterprise in the future. Such modifications and enhancements are intended to belong to various embodiments of the disclosure.

What is claimed is:

1. A computer-implemented method of providing rules for use in a malicious activity detection system, the computer-implemented method comprising:
   performing, by processing circuitry, evaluation operations on a plurality of malicious activity detection rules;
   ranking, by the processing circuitry, the plurality of malicious activity detection rules in an order based on results of the evaluation operations; and
   based on the order of the plurality of malicious activity detection rules, providing, by the processing circuitry, a malicious activity detection rule report which recommends a set of malicious activity detection rules of the plurality of malicious activity detection rules for use in the malicious activity detection system;
   wherein performing the evaluation operations on the plurality of malicious activity detection rules includes:
      deriving, for each rule of the plurality of malicious activity detection rules, a strength value indicating an amount of strength for that rule in detecting malicious activity relative to the other rules of the plurality of malicious activity detection rules; and
   wherein deriving the overall strength value for each rule includes:
      generating, for each rule, (i) a precision score which indicates an effectiveness of that rule in correctly identifying malicious activity from activity which is labeled as malicious by the malicious activity detection system, (ii) a recall score which indicates an effectiveness of that rule in correctly identifying malicious activity from actual malicious activity which is handled by the malicious activity detection system, and (iii) a correlation score which indicates a strength of correlation between that rule and malicious activity detection rules which are currently in use by the malicious activity detection system, and providing, as the strength value for each rule, an overall score based on the precision score, the recall score, and the correlation score for that rule.

2. A computer-implemented method as in claim 1 wherein the results of the evaluation operations include a plurality of numerical scores for the plurality of malicious activity detection rules; and wherein ranking the plurality of malicious activity detection rules in the order includes:

sorting the plurality of malicious activity detection rules based on the numerical scores for the plurality of malicious activity detection rules.

3. A computer-implemented method as in claim 1, further comprising:

prior to performing the evaluation operations, creating a set of new malicious activity detection rules and including the set of new malicious activity detection rules in the plurality of malicious activity detection rules.

4. A computer-implemented method as in claim 3 wherein creating the set of new malicious activity detection rules includes:

performing random forest operations to generate the set of new malicious activity detection rules.

5. A computer-implemented method as in claim 3 wherein creating the set of new malicious activity detection rules includes:

using association rules to generate the set of new malicious activity detection rules.

6. A computer-implemented method as in claim 3 wherein creating the set of new malicious activity detection rules includes:

providing, for a particular new malicious activity detection rule, a set of thresholds to define an aspect of that rule.

7. A computer-implemented method as in claim 1, further comprising:

based on the malicious activity detection rule report which recommends the set of malicious activity detection rules, introducing a new malicious activity detection rule into the malicious activity detection system to detect malicious activity, the new malicious activity detection rule being selected from the set of malicious activity detection rules.

8. A computer-implemented method as in claim 7 wherein the malicious activity detection system is constructed and arranged to detect malware at rest within a computerized device; and wherein introducing the new malicious activity detection rule includes:

configuring malware detection circuitry to detect malware at rest within the computerized device using the new malicious activity detection rule.

9. A computer-implemented method as in claim 7 wherein the malicious activity detection system is constructed and arranged to detect malware inflight within a computerized network; and wherein introducing the new malicious activity detection rule includes:

configuring malware detection circuitry to detect malware inflight within the computerized network using the new malicious activity detection rule.

10. A computer-implemented method as in claim 7 wherein the malicious activity detection system is constructed and arranged to detect fraudulent activity during authentication; and wherein introducing the new malicious activity detection rule includes:

configuring malware detection circuitry to detect fraudulent activity during authentication using the new malicious activity detection rule.

11. A computer-implemented method as in claim 1 wherein the plurality of malicious activity detection rules includes a set of rules that detects malicious code within data currently stored in non-volatile memory.

12. A computer program product having a non-transitory computer readable medium which stores a set of instructions to provide rules for use in a malicious activity detection system, the set of instructions, when carried out by computerized circuitry, causing the computerized circuitry to perform a method of:

performing evaluation operations on a plurality of malicious activity detection rules;

ranking the plurality of malicious activity detection rules in an order based on results of the evaluation operations; and based on the order of the plurality of malicious activity detection rules, providing a malicious activity detection rule report which recommends a set of malicious activity detection rules of the plurality of malicious activity detection rules for use in the malicious activity detection system;

wherein performing the evaluation operations on the plurality of malicious activity detection rules includes:

deriving, for each rule of the plurality of malicious activity detection rules, a strength value indicating an amount of strength for that rule in detecting malicious activity relative to the other rules of the plurality of malicious activity detection rules; and wherein deriving the overall strength value for each rule includes:

generating, for each rule, (i) a precision score which indicates an effectiveness of that rule in correctly identifying malicious activity from activity which is labeled as malicious by the malicious activity detection system, (ii) a recall score which indicates an effectiveness of that rule in correctly identifying malicious activity from actual malicious activity which is handled by the malicious activity detection system, and (iii) a correlation score which indicates a strength of correlation between that rule and malicious activity detection rules which are currently in use by the malicious activity detection system, and providing, as the strength value for each rule, an overall score based on the precision score, the recall score, and the correlation score for that rule.

13. A computer program product as in claim 12 wherein the results of the evaluation operations include a plurality of numerical scores for the plurality of malicious activity detection rules; and wherein ranking the plurality of malicious activity detection rules in the order includes:

sorting the plurality of malicious activity detection rules based on the numerical scores for the plurality of malicious activity detection rules.

14. A computer program product as in claim 13 wherein the method further comprises:

prior to performing the evaluation operations, creating a set of new malicious activity detection rules and including the set of new malicious activity detection rules in the plurality of malicious activity detection rules.

15. A computer program product as in claim 14 wherein the method further comprises:

based on the malicious activity detection rule report which recommends the set of malicious activity detection rules, introducing a new malicious activity detection rule into the malicious activity detection system to detect malicious activity, the new malicious activity detection rule being selected from the set of malicious activity detection rules.

16. A computer program product as in claim 12 wherein the plurality of malicious activity detection rules includes a set of rules that detects malicious code within data currently stored in non-volatile memory.

17. An electronic apparatus, comprising:
a user interface;
memory; and
control circuitry coupled to the user interface and the memory, the memory storing instructions which, when carried out by the control circuitry, cause the control circuitry to:
  perform evaluation operations on a plurality of malicious activity detection rules,
  rank the plurality of malicious activity detection rules in an order based on results of the evaluation operations, and
  based on the order of the plurality of malicious activity detection rules, provide a malicious activity detection rule report which recommends a set of malicious activity detection rules of the plurality of malicious activity detection rules for use in the malicious activity detection system;
wherein the results of the evaluation operations include a plurality of numerical scores for the plurality of malicious activity detection rules;
wherein ranking the plurality of malicious activity detection rules in the order includes:
  sorting the plurality of malicious activity detection rules based on the numerical scores for the plurality of malicious activity detection rules;
wherein performing the evaluation operations on the plurality of malicious activity detection rules includes:
  deriving, for each rule of the plurality of malicious activity detection rules, a strength value indicating an amount of strength for that rule in detecting malicious activity relative to the other rules of the plurality of malicious activity detection rules;
wherein deriving the overall strength value for each rule includes:
  generating, for each rule, (i) a precision score which indicates an effectiveness of that rule in correctly identifying malicious activity from activity which is labeled as malicious by the malicious activity detection system, (ii) a recall score which indicates an effectiveness of that rule in correctly identifying malicious activity from actual malicious activity which is handled by the malicious activity detection system, and (iii) a correlation score which indicates a strength of correlation between that rule and malicious activity detection rules which are currently in use by the malicious activity detection system, and
  providing, as the strength value for each rule, an overall score based on the precision score, the recall score, and the correlation score for that rule; and
wherein the control circuitry is further constructed and arranged to:
  prior to performing the evaluation operations, creating a set of new malicious activity detection rules and including the set of new malicious activity detection rules in the plurality of malicious activity detection rules, and based on the malicious activity detection rule report which recommends the set of malicious activity detection rules, introducing a new malicious activity detection rule into the malicious activity detection system to detect malicious activity, the new malicious activity detection rule being selected from the set of malicious activity detection rules.

18. An electronic apparatus, comprising:
a user interface;
memory; and
control circuitry coupled to the user interface and the memory, the memory storing instructions which, when carried out by the control circuitry, cause the control circuitry to:
  perform evaluation operations on a plurality of malicious activity detection rules,
  rank the plurality of malicious activity detection rules in an order based on results of the evaluation operations, and
  based on the order of the plurality of malicious activity detection rules, provide a malicious activity detection rule report which recommends a set of malicious activity detection rules of the plurality of malicious activity detection rules for use in the malicious activity detection system;
wherein performing the evaluation operations on the plurality of malicious activity detection rules includes:
  deriving, for each rule of the plurality of malicious activity detection rules, a strength value indicating an amount of strength for that rule in detecting malicious activity relative to the other rules of the plurality of malicious activity detection rules;
wherein deriving the overall strength value for each rule includes:
  generating, for each rule, (i) a precision score which indicates an effectiveness of that rule in correctly identifying malicious activity from activity which is labeled as malicious by the malicious activity detection system, (ii) a recall score which indicates an effectiveness of that rule in correctly identifying malicious activity from actual malicious activity which is handled by the malicious activity detection system, and (iii) a correlation score which indicates a strength of correlation between that rule and malicious activity detection rules which are currently in use by the malicious activity detection system, and
  providing, as the strength value for each rule, an overall score based on the precision score, the recall score, and the correlation score for that rule.

19. An electronic apparatus as in claim 18 wherein the results of the evaluation operations include a plurality of numerical scores for the plurality of malicious activity detection rules; and wherein the control circuitry, when ranking the plurality of malicious activity detection rules in the order, is constructed and arranged to:
  sort the plurality of malicious activity detection rules based on the numerical scores for the plurality of malicious activity detection rules.

20. An electronic apparatus as in claim 18 wherein the plurality of malicious activity detection rules includes a set of rules that detects malicious code within data currently stored in non-volatile memory.

* * * * *